United States Patent
Huang et al.

(10) Patent No.: US 10,423,258 B2
(45) Date of Patent: Sep. 24, 2019

(54) IN-CELL TOUCH SCREEN

(71) Applicant: WUHAN CHINA STAR OPTOELECTRONICS TECHNOLOGY CO., LTD., Wuhan (CN)

(72) Inventors: Yao-Li Huang, Wuhan (CN); Xinglong He, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 41 days.

(21) Appl. No.: 15/572,805

(22) PCT Filed: Aug. 8, 2017

(86) PCT No.: PCT/CN2017/096426
§ 371 (c)(1),
(2) Date: Nov. 9, 2017

(87) PCT Pub. No.: WO2018/232864
PCT Pub. Date: Dec. 27, 2018

(65) Prior Publication Data
US 2018/0364844 A1    Dec. 20, 2018

(30) Foreign Application Priority Data

Jun. 19, 2017  (CN) .......................... 2017 1 0463012

(51) Int. Cl.
*G06F 3/041*    (2006.01)
*G02F 1/1335*    (2006.01)
*G06F 3/047*    (2006.01)
*G02F 1/1333*    (2006.01)
*G02F 1/1343*    (2006.01)

(52) U.S. Cl.
CPC ........ *G06F 3/0412* (2013.01); *G02F 1/13338* (2013.01); *G02F 1/133512* (2013.01); *G02F 1/133514* (2013.01); *G06F 3/047* (2013.01); *G02F 2001/134318* (2013.01); *G02F 2201/121* (2013.01); *G06F 2203/04112* (2013.01)

(58) Field of Classification Search
CPC .... G06F 3/0412; G06F 3/047; G02F 1/13338; G02F 1/133512; G02F 1/133514
USPC ...... 345/173, 174, 178; 375/240.18; 349/12, 349/42; 366/219
See application file for complete search history.

(56) References Cited

U.S. PATENT DOCUMENTS

| | | | |
|---|---|---|---|
| 2004/0174934 A1* | 9/2004 | Komi | H04N 19/169 375/240.18 |
| 2012/0154728 A1* | 6/2012 | Oh | H01L 27/124 349/138 |
| 2014/0204055 A1* | 7/2014 | Lu | G06F 3/0412 345/174 |

(Continued)

*Primary Examiner* — Prabodh M Dharia
(74) *Attorney, Agent, or Firm* — JMB Davis Ben-David

(57) ABSTRACT

An in-cell touch screen is provided and has a color filter substrate and an array substrate disposed and facing the color filter substrate. The array substrate has a substrate, a buffer layer, a gate insulating layer, an interlayer insulating layer, a first planarization layer, a common electrode layer, a metal mesh wire, a second planarization layer, and sensing electrode wires, all of which are stacked in sequence. The sensing electrode wires are connected with the metal mesh wire through vias.

13 Claims, 3 Drawing Sheets

(56) References Cited

U.S. PATENT DOCUMENTS

| | | | |
|---|---|---|---|
| 2015/0172594 A1* | 6/2015 | Takada | G06F 3/1446 386/219 |
| 2015/0309619 A1* | 10/2015 | Kuo | G06F 3/044 345/174 |
| 2015/0331279 A1* | 11/2015 | Kimura | G02B 5/201 349/42 |
| 2016/0011710 A1* | 1/2016 | Fu | G06F 3/0416 349/12 |
| 2016/0070406 A1* | 3/2016 | Han | G06F 3/044 345/173 |
| 2016/0124280 A1* | 5/2016 | Park | G02F 1/136286 349/43 |
| 2017/0075471 A1* | 3/2017 | Hong | G06F 3/044 |
| 2017/0139251 A1* | 5/2017 | Wang | G02F 1/13338 |
| 2017/0160866 A1* | 6/2017 | Tsai | G06F 3/0416 |
| 2017/0269744 A1* | 9/2017 | Gharghi | G06F 3/0412 |
| 2017/0344330 A1* | 11/2017 | Masumoto | G06F 3/1446 |
| 2018/0164647 A1* | 6/2018 | Du | G02F 1/134309 |
| 2019/0004641 A1* | 1/2019 | Huang | G06F 3/0412 |

\* cited by examiner

IN-CELL TOUCH SCREEN

CROSS-REFERENCE TO RELATED APPLICATIONS

This is the U.S. National Stage of International Patent Application No. PCT/CN2017/096426, filed Aug. 8, 2017, which in turn claims the benefit of Chinese Patent Application No. 201710463012.1, filed Jun. 19, 2017.

FIELD OF THE DISCLOSURE

The present disclosure relates to the technical field of liquid crystal displays, and more particularly to an in-cell touch screen.

BACKGROUND OF THE DISCLOSURE

Touch screens are usually integrated in liquid crystal display panels, to form a variety of electronic products, such as mobile phones, laptops, MP3/MP4, etc. In order to improve a user experience with display devices, the display devices have been integrated extensively with touch screens.

The touch screens include touch electrodes used to sense touch positions. In conventional solutions, since a touch layer is a common electrode layer, the common electrode layer is patterned to form a number of common electrode plates insulated from each other. Each of the common electrode plates is electrically connected with sensing electrode wires through vias. The sensing electrode wires are used as leading wires to electrically connect the common electrode plates with a touch display chip. Conventional touch electrodes are formed of indium tin oxides (ITO), but the ITO has relatively poor conductive properties, thereby increasing resist and load delay of the common electrode plates, resulting in poor touch performance of the touch screens.

As shown in FIG. 1, an in-cell touch screen of the conventional technologies includes a substrate 101, a buffer layer 102 disposed on a surface of the substrate 101, a gate insulating layer 103 disposed on a surface of the buffer layer 102, an interlayer insulating layer 104 disposed on a surface of the gate insulating layer 103, a first planarization layer 105 disposed on a surface of the interlayer insulating layer 104, a common electrode layer 106 disposed on a surface of the first planarization layer 105, a dielectric layer 107 disposed on a surface of the common electrode layer 106, sensing electrode wires 110 disposed on a surface of the dielectric layer 107, a passivation layer 108 disposed on the surface of the dielectric layer 107, and a pixel electrode 109 disposed on a surface of the passivation layer 108.

The sensing electrode wires 110 are electrically connected with the common electrode layer 106 through vias 111 in the dielectric layer 107. The pixel electrode 109 is electrically connected with a drain electrode 112 of a thin film transistor through vias 113, and the vias 113 pass through the passivation layer 108, the dielectric layer 107, the common electrode layer 106, and the first planarization layer 105 in sequence.

As shown in FIG. 2, an in-cell touch screen of the conventional technologies includes a planarization layer 201. A common electrode layer is disposed on a surface of the planarization layer 201, wherein a patterning process is performed on the common electrode layer to form a number of common electrode plates 202 insulated from each other. Each of the common electrode plates 202 is electrically connected with a sensing electrode wire 203, and another end of the sensing electrode wire 203 is connected with a touch display chip 204.

As mentioned above, since the common electrode plates, used as the touch electrodes, of in-cell touch screens in conventional technologies have poor conductive properties, touch signal delay is increased or decreased thereby resulting in poor touch performance of the touch screens.

SUMMARY OF THE DISCLOSURE

The present disclosure provides an in-cell touch screen, which can improve conductive properties of common electrode plates, to decrease load delays of touch signals. Therefore, the technical problems that, since the common electrode plates, used as the touch electrodes, of in-cell touch screens in conventional technologies have poor conductive properties, touch signal delay is increased or decreased thereby resulting in poor touch performance of the touch screens, can be solved.

In order to solve the above problems, a technical solution of the present disclosure is provided as follows:

The present disclosure provides an in-cell touch screen including:
  a color filter substrate including:
    a first glass substrate;
    a color resist layer disposed on a surface of the first glass substrate; and
    a black matrix disposed on the surface of the first glass substrate; and
  an array substrate disposed and facing the color filter substrate, wherein the array substrate includes:
    a second glass substrate;
    a buffer layer disposed on a surface of the second glass substrate;
    a gate insulating layer disposed on a surface of the buffer layer;
    an interlayer insulating layer disposed on a surface of the gate insulating layer;
    a first planarization layer disposed on a surface of the interlayer insulating layer;
    a common electrode layer disposed on a surface of the first planarization layer;
    a metal mesh wire disposed on a surface of the common electrode layer, wherein the metal mesh wire overlaps a covering area of the black matrix;
    a second planarization layer disposed on a surface of the metal mesh wire, wherein a plurality of vias are formed in the second planarization layer; and
    sensing electrode wires disposed on a surface of the second planarization layer and connected with the metal mesh wire through the vias.

According to a preferred embodiment of the present disclosure, a film thickness of the first planarization layer is a normal thickness, and a film thickness of the second planarization layer is twice the film thickness of the first planarization layer.

According to a preferred embodiment of the present disclosure, a patterning process is performed on the common electrode layer to form a number of common electrode plates distributed in an array, and each of the common electrode plates is connected with a touch chip by each of the corresponding sensing electrode wires.

According to a preferred embodiment of the present disclosure, a patterning process is performed on the metal mesh wire to form a number of metal mesh plates distributed in an array, an aspect ratio of each of the metal mesh plates is same as an aspect ratio of each of the common electrode plates, and each of the metal mesh plates is located on a surface of each of the corresponding common electrode plates.

The present disclosure provides an in-cell touch screen including:
a color filter substrate including:
  a first glass substrate;
  a color resist layer disposed on a surface of the first glass substrate; and
  a black matrix disposed on the surface of the first glass substrate; and
an array substrate disposed and facing the color filter substrate, wherein the array substrate includes:
  a second glass substrate;
  a buffer layer disposed on a surface of the second glass substrate;
  a gate insulating layer disposed on a surface of the buffer layer;
  an interlayer insulating layer disposed on a surface of the gate insulating layer;
  a first planarization layer disposed on a surface of the interlayer insulating layer;
  a common electrode layer disposed on a surface of the first planarization layer;
  a metal mesh wire disposed on a surface of the common electrode layer;
  a second planarization layer disposed on a surface of the metal mesh wire, wherein a plurality of vias are formed in the second planarization layer; and
  sensing electrode wires disposed on a surface of the second planarization layer and connected with the metal mesh wire through the vias.

According to a preferred embodiment of the present disclosure, a film thickness of the first planarization layer is a normal thickness, and a film thickness of the second planarization layer is twice the film thickness of the first planarization layer.

According to a preferred embodiment of the present disclosure, a patterning process is performed on the common electrode layer to form a number of common electrode plates distributed in an array, and each of the common electrode plates is connected with a touch chip by each of the corresponding sensing electrode wires.

According to a preferred embodiment of the present disclosure, a patterning process is performed on the metal mesh wire to form a number of metal mesh plates distributed in an array, an aspect ratio of each of the metal mesh plates is same as an aspect ratio of each of the common electrode plates, and each of the metal mesh plates is located on a surface of each of the corresponding common electrode plates.

According to the above purpose of the present disclosure, an in-cell touch screen is further provided, including:
a color filter substrate including:
  a first glass substrate;
  a color resist layer disposed on a surface of the first glass substrate; and
  a black matrix disposed on the surface of the first glass substrate; and
an array substrate disposed and facing the color filter substrate, wherein the array substrate includes:
  a second glass substrate;
  a buffer layer disposed on a surface of the second glass substrate;
  a gate insulating layer disposed on a surface of the buffer layer;
  an interlayer insulating layer disposed on a surface of the gate insulating layer;
  a first planarization layer disposed on a surface of the interlayer insulating layer;
  sensing electrode wires disposed on a surface of the first planarization layer;
  a second planarization layer disposed on the surface of the first planarization layer, wherein a plurality of vias are formed in the second planarization layer;
  a common electrode layer disposed on a surface of the second planarization layer and connected with the sensing electrode wires through the vias; and
  a metal mesh wire disposed on a surface of the common electrode layer.

According to a preferred embodiment of the present disclosure, the metal mesh wire overlaps a covering area of the black matrix.

According to a preferred embodiment of the present disclosure, a film thickness of the first planarization layer is a normal thickness, and a film thickness of the second planarization layer is twice the film thickness of the first planarization layer.

According to a preferred embodiment of the present disclosure, a patterning process is performed on the common electrode layer to form a number of common electrode plates distributed in an array, and each of the common electrode plates is connected with a touch chip by each of the corresponding sensing electrode wires.

According to a preferred embodiment of the present disclosure, a patterning process is performed on the metal mesh wire to form a number of metal mesh plates distributed in an array, an aspect ratio of each of the metal mesh plates is same as an aspect ratio of each of the common electrode plates, and each of the metal mesh plates is located on a surface of each of the corresponding common electrode plates.

The beneficial effects of the present disclosure are that: in comparison with a conventional in-cell touch screen, an in-cell touch screen provided by the present disclosure has metal mesh plates disposed on a surface of common electrode plates to improve the conductive property of the common electrode plates. Further, the delay of touch signals is decreased, and touch performance of the touch screen is improved. Therefore, the technical problems that, because the common electrode plates used as the touch electrodes of in-cell touch screens in conventional technologies have poor conductive property, touch signal delay is increased or decreased, thereby resulting in poor touch performance of the touch screens, are solved.

DESCRIPTION OF THE DRAWINGS

In order to more clearly describe embodiments of the present disclosure or technical solutions in a conventional technology, drawings required to be used for the embodiments or descriptions of the conventional technology are simply described hereinafter. The drawings described below only illustrate some embodiments of the present disclosure. Those skilled in the art can obtain other drawings based on these drawings disclosed herein without creative effort.

DETAILED DESCRIPTION OF THE PREFERRED EMBODIMENTS

The following description of the embodiments, with reference to the appended drawings, is used for illustrating specific embodiments which may be used for carrying out the present disclosure. The directional terms described by the present disclosure, such as "upper", "lower", "front", "back", "left", "right", "inner", "outer", "side", etc., are only directions by referring to the accompanying drawings. Thus, the used directional terms are used to describe and understand the present disclosure, but the present disclosure is not limited thereto. In figures, elements with similar structures are indicated by the same numbers.

The present disclosure is focused on the technical problems that, because the common electrode plates used as the touch electrodes of touch screens in conventional technologies have poor conductive properties, touch signal delay is increased or decreased, thereby resulting in poor touch performance of the touch screens. Embodiments of the present disclosure can solve the defects.

Figure 1:
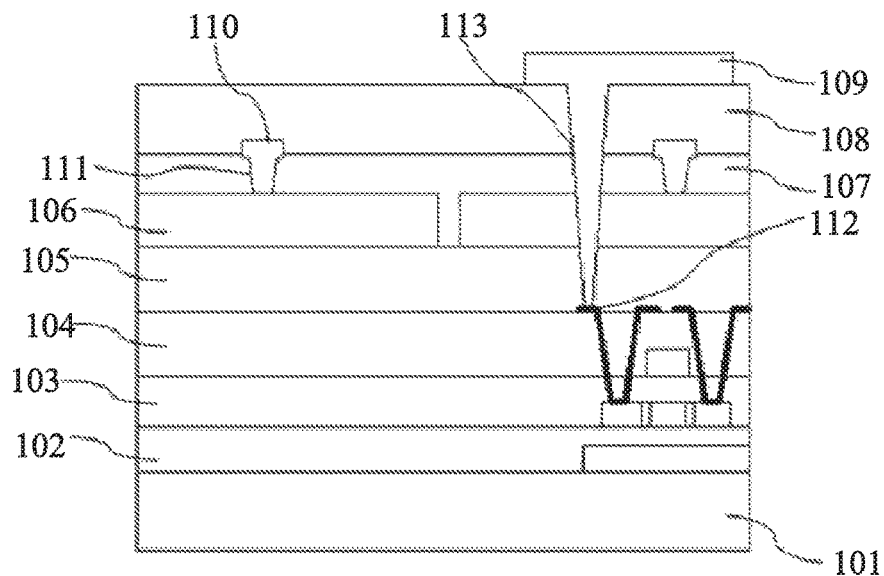
FIG. 1 is a structural diagram of a film layer of a conventional in-cell touch screen.

As shown in FIG. 1, an in-cell touch screen of the conventional technologies includes a substrate 101, a buffer layer 102 disposed on a surface of the substrate 101, a gate insulating layer 103 disposed on a surface of the buffer layer 102, an interlayer insulating layer 104 disposed on a surface of the gate insulating layer 103, a first planarization layer 105 disposed on a surface of the interlayer insulating layer 104, a common electrode layer 106 disposed on a surface of the first planarization layer 105, a dielectric layer 107 disposed on a surface of the common electrode layer 106, sensing electrode wires 110 disposed on a surface of the dielectric layer 107, a passivation layer 108 disposed on the surface of the dielectric layer 107, and a pixel electrode 109 disposed on a surface of the passivation layer 108.

The sensing electrode wires 110 are electrically connected with the common electrode layer 106 through vias 111 in the dielectric layer 107. The pixel electrode 109 is electrically connected with a drain electrode 112 of a thin film transistor through vias 113, and the vias 113 pass through the passivation layer 108, the dielectric layer 107, the common electrode layer 106, and the first planarization layer 105 in sequence.

Figure 2:
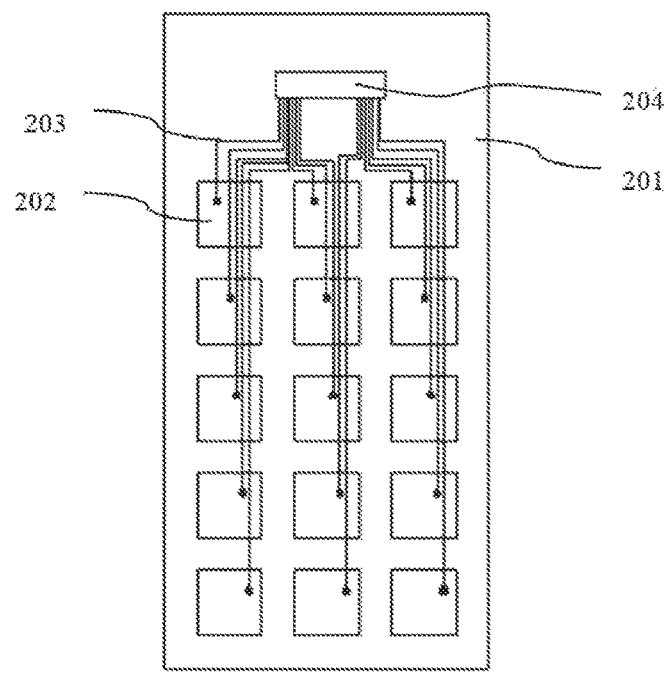
FIG. 2 is a diagram of touch principle of a conventional in-cell touch screen.

As shown in FIG. 2, an in-cell touch screen of the conventional technologies includes a planarization layer 201. A common electrode layer is disposed on a surface of the planarization layer 201, wherein a patterning process is performed on the common electrode layer to form a number of common electrode plates 202 insulated from each other. Each of the common electrode plates 202 is electrically connected with a sensing electrode wire 203, and another end of the sensing electrode wire 203 is connected with a touch display chip 204.

Figure 3:
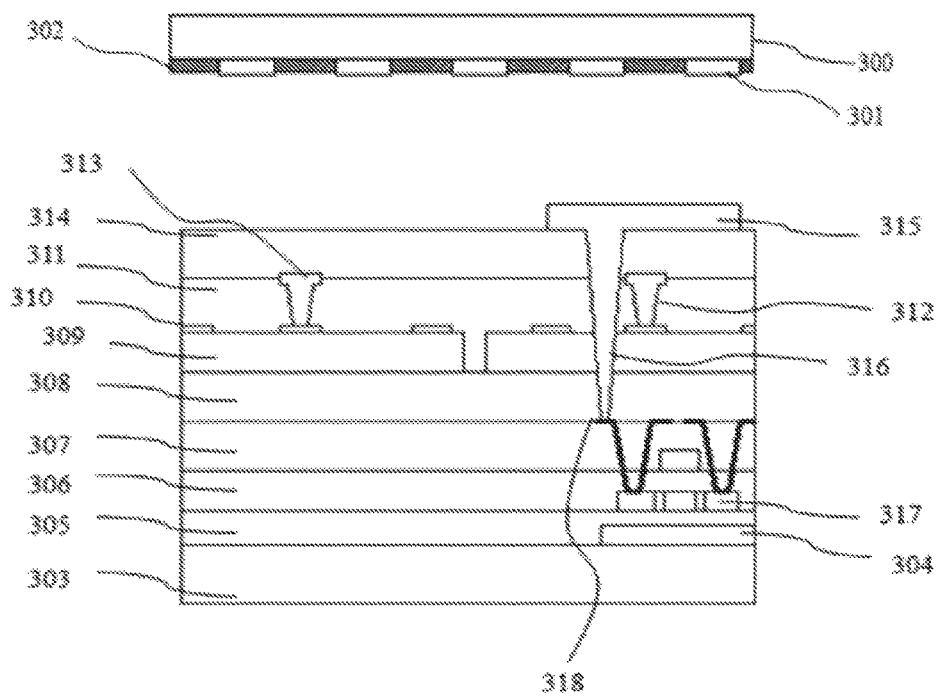
FIG. 3 is a structural diagram of a film layer of an in-cell touch screen of Embodiment 1 of the present disclosure.

As shown in FIG. 3, an in-cell touch screen provided by the present disclosure includes a color filter substrate including: a first glass substrate 300; a color resist layer 301 disposed on a surface of the first glass substrate 300; and a black matrix 302 disposed on the surface of the first glass substrate 300; an array substrate disposed and facing the color filter substrate, wherein the array substrate includes: a second glass substrate 303; a metal light-shielding layer 304 disposed on a surface of the second glass substrate 303; a buffer layer 305 disposed on the surface of the second glass substrate 303 and a surface of the metal light-shielding layer 304; a gate insulating layer 306 disposed on a surface of the buffer layer 305; an interlayer insulating layer 307 disposed on a surface of the gate insulating layer 306; a first planarization layer 308 disposed on a surface of the interlayer insulating layer 307; a common electrode layer 309 disposed on a surface of the first planarization layer 308; a metal mesh wire 310 disposed on a surface of the common electrode layer 309; a second planarization layer 311 disposed on a surface of the metal mesh wire 310, wherein a plurality of sensing electrode vias 312 are formed in the second planarization layer 311; sensing electrode wires 313 disposed on a surface of the second planarization layer 311 and connected with the metal mesh wire 310 through the sensing electrode vias 312; and a passivation layer 314 disposed on the surface of the second planarization layer 311.

A pixel electrode 315 is disposed on a surface of the passivation layer 314. The pixel electrode 315 is electrically connected with a drain electrode 318 of a corresponding thin film transistor 317 through a pixel electrode via 316, wherein the pixel electrode via 316 passes through the passivation layer 314, the second planarization layer 311, the common electrode layer 309, and the first planarization layer 308.

The metal mesh wire 310 overlaps a covering area of the black matrix 302, i.e., the metal mesh wire 310 is hidden by being located directly below the black matrix 302, to prevent from light being shielded by the metal mesh wire 310, thereby reducing an opening area of pixels.

A film thickness of the first planarization layer 308 is a normal thickness, and a film thickness of the second planarization layer 311 is twice the film thickness of the first planarization layer 308. A distance between the common electrode layer 309 and the sensing electrode wires 313 can be increased by increasing the film thickness of the first planarization layer 308, to avoid touch signal crosstalk induced by forming an electric capacity between the common electrode plates and the sensing electrode wires 313 corresponding the neighboring common electrode plates, wherein the common electrode plates is formed by patterning the common electrode layer 309.

Figure 4:
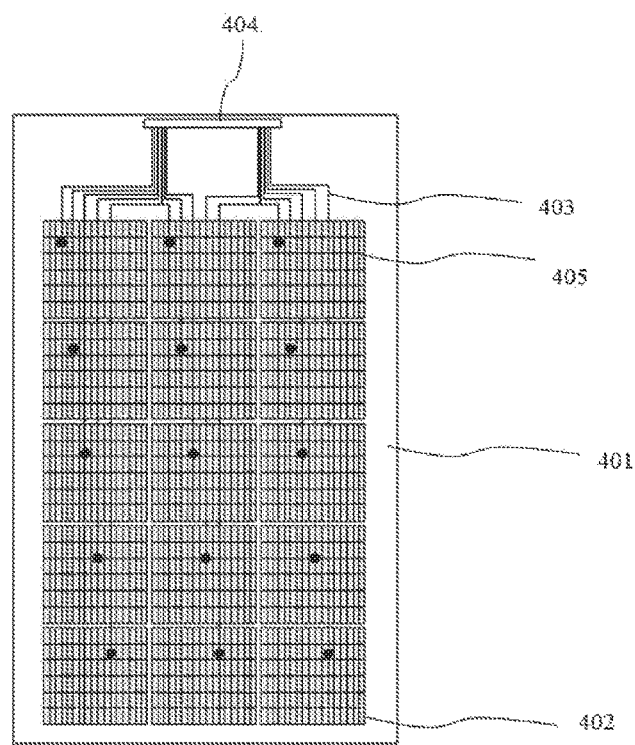
FIG. 4 is a diagram of touch principle of an in-cell touch screen of Embodiment 1 of the present disclosure.

As shown in FIG. 4, in the in-cell touch screen of the present disclosure, a patterning process is performed on the common electrode layer which is disposed on a surface of the second planarization layer 401 to form a number of common electrode plates 402 distributed in an array, and each of the common electrode plates 402 is insulated from each other.

A patterning process is performed on the metal mesh wire to form a number of metal mesh plates distributed in an array, an aspect ratio of each of the metal mesh plates 405 is same as an aspect ratio of each of the common electrode plates 402, and one of the metal mesh plates 405 is located correspondingly on a surface of one of the common electrode plates 402.

Each of the metal mesh plates 405 is correspondingly connected with a sensing electrode wire 403, and another end of the sensing electrode wire 403 is connected with a touch display chip 404. The touch display chip 404 in a touch status can determine a touch position by detecting a voltage change between the common electrode plates 402 and the sensing electrode wire 403 of a touch area. When the screen is not touched by a human body, a voltage between the common electrode plates 402 and the sensing electrode wire 403 is a fixed value, and a touch signal is not produced.

Figure 5:
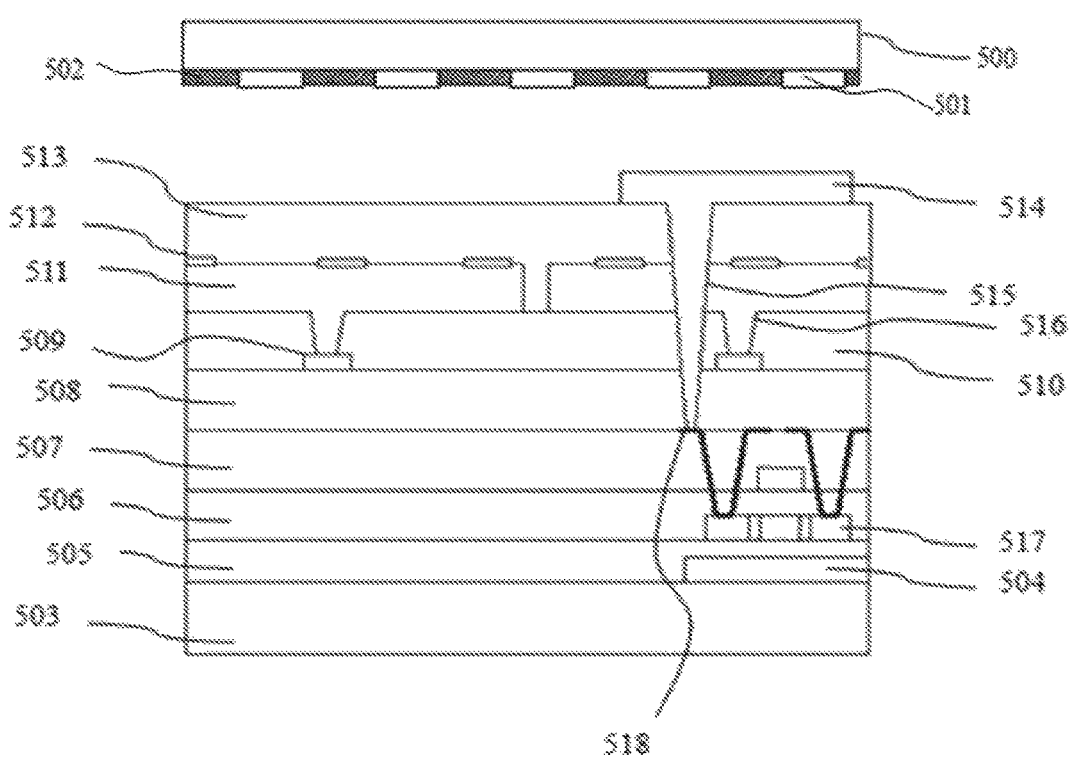
FIG. 5 is a structural diagram of a film layer of an in-cell touch screen of Embodiment 2 of the present disclosure.

As shown in FIG. 5, an in-cell touch screen further provided by the present disclosure includes: a color filter substrate including: a first glass substrate; a color resist layer 501 disposed on a surface of the first glass substrate; and a black matrix 502 disposed on the surface of the first glass substrate; and an array substrate disposed and facing the color filter substrate, wherein the array substrate includes: a second glass substrate 503; a metal light-shielding layer 504 disposed on a surface of the second glass substrate 503; a buffer layer 505 disposed on the surface of the second glass substrate 503 and a surface of the metal light-shielding layer 504; a gate insulating layer 506 disposed on a surface of the buffer layer 505; an interlayer insulating layer 507 disposed on a surface of the gate insulating layer 506; a first planarization layer 508 disposed on a surface of the interlayer insulating layer 507; sensing electrode wires 509 disposed on a surface of the first planarization layer 508; a second planarization layer 510 disposed on the surface of the first planarization layer 508 and surfaces of the sensing electrode wires 509, wherein a plurality of sensing electrode vias 516 are formed in the second planarization layer 510; a common electrode layer 511 disposed on a surface of the second planarization layer 510; a metal mesh wire 512 disposed on a surface of the common electrode layer 511; a passivation layer 513 disposed on a surface of the metal mesh wire 512 and the surface of the common electrode layer 511; and a pixel electrode 514 disposed on a surface of the passivation layer 513. The pixel electrode 514 is electrically connected with a drain electrode 518 of a corresponding thin film transistor 517 through a pixel electrode via 515, wherein the pixel electrode via 515 passes through the passivation layer 513, the common electrode layer 511, the second planarization layer 510, and the first planarization layer 508. The sensing electrode wires 509 are connected with the common electrode layer 511 through the sensing electrode vias 516.

A touch principle of the touch screen of the present preferred embodiment is consistent with a working principle of the touch screen of the above preferred embodiment. Specifically, reference can be made to the working principle of the above preferred embodiment, and will not be described here again.

As described above, although the present disclosure has been described in preferred embodiments, they are not intended to limit the disclosure. One of ordinary skill in the art, without departing from the spirit and scope of the disclosure within, can make various modifications and variations, so the range of the scope of the disclosure is defined by the claims.

What is claimed is:

1. An in-cell touch screen, comprising:
   a color filter substrate, comprising:
      a first glass substrate;
      a color resist layer disposed on a surface of the first glass substrate; and
      a black matrix disposed on the surface of the first glass substrate; and
   an array substrate disposed and facing the color filter substrate, wherein the array substrate comprises:
      a second glass substrate;
      a buffer layer disposed on a surface of the second glass substrate;
      a gate insulating layer disposed on a surface of the buffer layer;
      an interlayer insulating layer disposed on a surface of the gate insulating layer;
      a first planarization layer disposed on a surface of the interlayer insulating layer;
      a common electrode layer disposed on a surface of the first planarization layer;
      a metal mesh wire disposed on a surface of the common electrode layer, wherein
      the metal mesh wire overlaps a covering area of the black matrix;
      a second planarization layer disposed on a surface of the metal mesh wire,
      wherein a plurality of vias are formed in the second planarization layer; and
      sensing electrode wires disposed on a surface of the second planarization layer and connected with the metal mesh wire through the vias.

2. The in-cell touch screen according to claim 1, wherein a film thickness of the second planarization layer is twice a film thickness of the first planarization layer.

3. The in-cell touch screen according to claim 1, wherein a patterning process is performed on the common electrode layer to form a number of common electrode plates distributed in an array, and each of the common electrode plates is connected with a touch chip by each of the corresponding sensing electrode wires.

4. The in-cell touch screen according to claim 3, wherein a patterning process is performed on the metal mesh wire to form a number of metal mesh plates distributed in an array, an aspect ratio of each of the metal mesh plates is same as an aspect ratio of each of the common electrode plates, and each of the metal mesh plates is located on a surface of each of the corresponding common electrode plates.

5. An in-cell touch screen, comprising:
   a color filter substrate, comprising:
      a first glass substrate;
      a color resist layer disposed on a surface of the first glass substrate; and
      a black matrix disposed on the surface of the first glass substrate; and
   an array substrate disposed and facing the color filter substrate, wherein the array substrate comprises:
      a second glass substrate;
      a buffer layer disposed on a surface of the second glass substrate;
      a gate insulating layer disposed on a surface of the buffer layer;
      an interlayer insulating layer disposed on a surface of the gate insulating layer;
      a first planarization layer disposed on a surface of the interlayer insulating layer;
      a common electrode layer disposed on a surface of the first planarization layer;
      a metal mesh wire disposed on a surface of the common electrode layer;
      a second planarization layer disposed on a surface of the metal mesh wire,
      wherein a plurality of vias are formed in the second planarization layer; and
      sensing electrode wires disposed on a surface of the second planarization layer and connected with the metal mesh wire through the vias.

6. The in-cell touch screen according to claim 5, wherein a film thickness of the second planarization layer is twice a film thickness of the first planarization layer.

7. The in-cell touch screen according to claim 5, wherein a patterning process is performed on the common electrode layer to form a number of common electrode plates distributed in an array, and each of the common electrode plates is connected with a touch chip by each of the corresponding sensing electrode wires.

8. The in-cell touch screen according to claim 7, wherein a patterning process is performed on the metal mesh wire to form a number of metal mesh plates distributed in an array, an aspect ratio of each of the metal mesh plates is same as an aspect ratio of each of the common electrode plates, and each of the metal mesh plates is located on a surface of each of the corresponding common electrode plates.

9. An in-cell touch screen, comprising:
a color filter substrate comprising:
 a first glass substrate;
 a color resist layer disposed on a surface of the first glass substrate; and
 a black matrix disposed on the surface of the first glass substrate; and
an array substrate disposed and facing the color filter substrate, wherein the array substrate comprises:
 a second glass substrate;
 a buffer layer disposed on a surface of the second glass substrate;
 a gate insulating layer disposed on a surface of the buffer layer;
 an interlayer insulating layer disposed on a surface of the gate insulating layer;
 a first planarization layer disposed on a surface of the interlayer insulating layer;
 sensing electrode wires disposed on a surface of the first planarization layer;
 a second planarization layer disposed on the surface of the first planarization layer, wherein a plurality of vias are formed in the second planarization layer;
 a common electrode layer disposed on a surface of the second planarization layer and connected with the sensing electrode wires through the vias; and
 a metal mesh wire disposed on a surface of the common electrode layer.

10. The in-cell touch screen according to claim 9, wherein the metal mesh wire overlaps a covering area of the black matrix.

11. The in-cell touch screen according to claim 9, wherein a film thickness of the second planarization layer is twice a film thickness of the first planarization layer.

12. The in-cell touch screen according to claim 9, wherein a patterning process is performed on the common electrode layer to form a number of common electrode plates distributed in an array, and each of the common electrode plates is connected with a touch chip by each of the corresponding sensing electrode wires.

13. The in-cell touch screen according to claim 12, wherein a patterning process is performed on the metal mesh wire to form a number of metal mesh plates distributed in an array, an aspect ratio of each of the metal mesh plates is same as an aspect ratio of each of the common electrode plates, and each of the metal mesh plates is located on a surface of each of the corresponding common electrode plates.

* * * * *